United States Patent
Riley et al.

(10) Patent No.: US 6,467,696 B2
(45) Date of Patent: Oct. 22, 2002

(54) ENVIRONMENTAL CONTROL SYSTEM

(75) Inventors: William P. Riley; William P. Riley, II, both of Plainwell, MI (US)

(73) Assignee: Gun Valley Temperature Controls LLC, Plainwell, MI (US)

( * ) Notice: Subject to any disclaimer, the term of this patent is extended or adjusted under 35 U.S.C. 154(b) by 0 days.

(21) Appl. No.: 09/953,320

(22) Filed: Sep. 14, 2001

(65) Prior Publication Data

US 2002/0036238 A1 Mar. 28, 2002

Related U.S. Application Data

(60) Division of application No. 09/757,163, filed on Jan. 9, 2001, which is a continuation-in-part of application No. 09/621,509, filed on Jul. 21, 2000.

(51) Int. Cl.[7] .................................................. F24F 7/00
(52) U.S. Cl. .......................... 236/49.3; 62/144; 62/186; 62/332; 62/411; 62/78
(58) Field of Search ............................. 236/49.3; 62/56, 62/440, 441, 186, 332, 411, 78; 318/471; 454/175, 177; 165/214, 217

(56) References Cited

U.S. PATENT DOCUMENTS

| | | | |
|---|---|---|---|
| 3,418,914 A | * 12/1968 | Finkin ........................ 318/471 |
| 3,801,888 A | 4/1974 | Faulkner |
| 3,896,359 A | 7/1975 | Olander et al. |
| 4,113,175 A | * 9/1978 | Sutton, Jr. .................. 236/49.3 |
| 4,136,822 A | 1/1979 | Felter |
| 4,250,716 A | * 2/1981 | Huffman ...................... 62/332 |
| 4,257,238 A | 3/1981 | Kountz et al. |
| 4,299,092 A | * 11/1981 | Ibrahim ....................... 62/441 |
| 4,389,853 A | 6/1983 | Hile |
| 4,493,194 A | * 1/1985 | Briccetti ...................... 62/186 |
| 4,506,199 A | 3/1985 | Asche |
| 4,553,584 A | * 11/1985 | Bloomquist .................. 62/186 |
| 4,619,114 A | * 10/1986 | Wilson ........................ 62/332 |
| 4,648,551 A | 3/1987 | Thompson et al. |
| 4,682,473 A | 7/1987 | Rogers, III |
| 4,773,587 A | 9/1988 | Lipman |
| 4,806,832 A | * 2/1989 | Muller ........................ 318/471 |
| 4,941,325 A | 7/1990 | Nuding |
| 4,942,921 A | * 7/1990 | Haessig et al. ............. 165/214 |
| 4,993,629 A | * 2/1991 | Wylie ......................... 236/49.3 |
| 5,065,593 A | * 11/1991 | Dudley et al. ................ 62/186 |
| 5,102,040 A | * 4/1992 | Harvey ....................... 236/49.3 |
| 5,170,935 A | 12/1992 | Federspiel et al. |
| 5,197,667 A | * 3/1993 | Bowsky et al. ............. 236/49.3 |
| 5,255,529 A | 10/1993 | Powell et al. |
| 5,292,280 A | 3/1994 | Janu et al. |
| 5,364,026 A | * 11/1994 | Kundert ...................... 318/471 |
| 5,410,230 A | 4/1995 | Bessler et al. |
| 5,413,165 A | * 5/1995 | Wylie .......................... 62/186 |
| 5,491,649 A | 2/1996 | Friday, Jr. et al. |
| 5,492,273 A | 2/1996 | Shah |
| 5,497,629 A | * 3/1996 | Rafalovich et al. ........... 62/332 |
| 5,544,809 A | 8/1996 | Keating et al. |

(List continued on next page.)

Primary Examiner—Teresa Waldberg
Assistant Examiner—Fadi H. Dahbour
(74) Attorney, Agent, or Firm—TraskBritt

(57) ABSTRACT

A method and system for controlling the environment of residential and commercial buildings. Movement of air within the facilities is accomplished by air handling units or fans. The speed of each air handling unit is controlled by a variable-speed drive, allowing the air handling units to run at speeds below full capacity. Environmental parameters, such as temperature or humidity, are monitored to determine the existing state of the environment, which is then compared to a desired state. The speed of the fans, or air handling units, is adjusted to alter the existing environmental state, bringing it in alignment with the desired state. The fans, or air handling units, are operated continuously, typically at reduced capacity. Other various facets are included with the system and method including the control of the mixture of air supplied to the internal environment of the building.

13 Claims, 4 Drawing Sheets

U.S. PATENT DOCUMENTS

| | | | |
|---|---|---|---|
| 5,707,005 A | * | 1/1998 | Kettler et al. ............... 236/49.3 |
| 5,711,159 A | * | 1/1998 | Whipple, III ................. 62/441 |
| 5,769,314 A | | 6/1998 | Drees et al. |
| 5,847,526 A | * | 12/1998 | Lasko et al. ................ 318/471 |
| 5,971,067 A | * | 10/1999 | Rayburn et al. ............ 165/217 |
| 6,037,732 A | * | 3/2000 | Alfano et al. ................ 318/471 |
| 6,040,668 A | * | 3/2000 | Huynh et al. ................ 318/471 |
| 6,188,189 C1 | * | 2/2001 | Blake ......................... 318/471 |

* cited by examiner

ENVIRONMENTAL CONTROL SYSTEM

CROSS-REFERENCE TO RELATED APPLICATIONS

This application is a divisional of application Ser. No. 09/757,163, filed Jan. 9, 2001, pending, which is a continuation-in-part (CIP) of application Ser. No. 09/621,509, filed Jul. 21, 2000, pending.

BACKGROUND OF THE INVENTION

Field of the Invention

The present invention relates generally to environmental control of buildings suited for human occupancy. More particularly, the present invention relates to the control of such environmental parameters as temperature, humidity, particulate levels, or even specified gas levels such as carbon dioxide ($CO_2$) at increased efficiency.

State of the Art

Indoor air quality and environmental control is of great concern with regard to both residential and commercial buildings. Occupants of such buildings desire to utilize these buildings in comfort and in safety. In typical heating, ventilation and air conditioning (HVAC) systems, many environmental parameters, such as temperature, humidity, and other air quality parameters, may be controlled. Typically, control of these and other environmental parameters entails, among other things, movement of air within the building, which can include introduction of fresh air from outside the building or circulation of existing air within the building. In controlling a building's environment, air may be passed through furnaces, across refrigerated coils, or through humidification devices prior to introduction of the air into the occupied regions of the building. Control of an HVAC system may also include the combination of more than one of the above techniques to control multiple parameters within the building's environment simultaneously.

A typical method of controlling the air movement and other environmental parameters within a building is through the cyclical control of fans, or blowers, which are an integral part of an HVAC component known as an air handling unit. For example, when it is desired to cool the building, or a particular space within the building, the air handling units are turned on when the temperature rises above a predetermined upper level and then shut off when the temperature of the facility reaches a predetermined lower level. A system of this type is generally described in U.S. Pat. No. 4,682,473 to Rogers, III. This type of system utilizes the fans at full power, allowing them to cool or heat the facility at a relatively quick pace within a specified temperature range. Such systems, however, possess a number of shortcomings. For example, rapid changes in temperature, or temperature spikes, may often result in some discomfort for the occupants. Similarly, rapid changes in other environmental parameters may cause occupant discomfort. Furthermore, cyclical use of air handling units at full power or full speed may result in inefficient control of such parameters.

Other known systems have sought to utilize multi-speed or variable-speed fans in controlling an HVAC system. Such a system is described in U.S. Pat. No. 5,492,273 to Shah, which includes a variable-speed blower motor for controlling the volumetric rate of airflow within the system. This type of system allows for a more gradual and natural change of an environmental parameter within defined parameter ranges. However, because the system is still cyclical in nature, it does not provide control of the building environment at a desirable level of efficiency. For example, in controlling temperature, the fans will remain inoperative if the temperature of the facility is within a defined temperature range. The fans will then operate at a predefined speed setting once the temperature increases into a second defined range. The blower continues to operate for a time period calculated as the expected interval of operation. If at the end of the expected interval of operation the temperature is not within the desired range, the blower will increase its speed to more quickly effect the desired temperature change. Once the desired temperature has been reached, operation of the blower is terminated until the temperature falls outside of the prescribed range once again. The fans will operate at a high-speed setting if the temperature increases into a third defined range.

All of the above techniques, due to their cyclical nature, include defining a range of operation, such as a temperature range. However, it is difficult to narrowly define the ranges. If the ranges are defined too narrowly, the air handling unit will repeatedly start and stop as the parameter fluctuates in and out of the prescribed range. Such incessant starting and stopping is likely to cause wear and fatigue-type damage to various components of the air handling unit, such as starters, motors and mechanical transmission components. On the other hand, if the defined ranges are set too broadly, high temperatures may cause the fans to operate at the high-speed setting for extended periods of time in an attempt to bring the temperature back to an acceptable value. Such overuse of air handling units at full speed or power results in an inefficient HVAC system. Furthermore, a broad parameter range may simply not be acceptable from a comfort standpoint.

As noted above, an important consideration in the environmental control of a commercial or residential building is the efficient use of power. With air handling units which are cyclically controlled, power consumption is of paramount concern to those responsible for the maintenance of the building. Occupancy of such buildings for any extended period of time requires a significant consumption of power with existing systems and methods. The cost of such power is ultimately borne by the occupant. Thus, an efficient and accurate environmental control system for such buildings would be of benefit to both the owners and tenants of the buildings.

In view of the shortcomings in the art, it would be advantageous to provide an environmental control system for commercial and residential buildings which effectively controls specified environmental parameters while consuming a reduced amount of energy. Such a system or method should be simple to employ in existing as well as newly constructed buildings.

SUMMARY OF THE INVENTION

In accordance with one aspect of the invention, a method is provided for controlling the internal environment of a building intended for human occupancy, such as a commercial or residential building. The method includes the steps of providing a fan, or a plurality of fans, for circulating the internal air of the building. The fans may be operated continuously at a speed which is below their full capacity to achieve continuous parameter control at reduced power consumption. The system monitors a parameter indicative of the internal environment of the building, such as the internal temperature. Once the temperature has been monitored, the speed of the fans is altered accordingly. If the internal temperature needs to be reduced, then the fans may be operated at a higher incremental rotational speed to increase the air movement within the building. Likewise, if the air temperature needs to be increased, the fan speeds may again be incrementally altered. The same method may be employed to effect changes in airflow rate in order to obtain a desired value for various target parameters.

Additionally, environmental parameters outside of the building may be monitored to assist in the regulation of airflow in the internal environment. For example, external air temperature may be monitored, compared to the desired building temperature, if desired, and admitted into the building via a ventilation inlet. Various restrictions may be placed on the admittance of outside air, such as preventing outside air from being introduced into the building when the outside temperature is above or below a predetermined target or range.

The method may also include conditioning the air which is provided to the internal environment. Such conditioning may include, for example, passing the air over heating or cooling coils, subjecting the air to a filtering process, or subjecting the air to a process of humidification or dehumidification.

In accordance with another aspect of the present invention, a system is provided for controlling the internal environment of a building designated for human occupancy. The system includes an air handling unit, including a fan or multiple fans that are adapted to operate continuously. The fans are configured to allow their continuous operation at speeds which are below their operational capacity. More specifically, each fan is coupled to a variable-speed drive for controlling the operational speed thereof. At least one sensor is employed to monitor one or more internal environmental parameters of the building, such as temperature, humidity, gas levels, or particulate levels. The sensor is coupled to an electronic control unit which is, in turn, coupled to at least one of the variable-speed drives. The sensor provides a signal to the electronic control unit, the signal representing a measured value of an internal environmental parameter. The electronic control unit then provides a signal to the variable-speed drive based upon the sensed parameter, causing the associated fan to vary in speed accordingly.

Additional elements may be configured with the system to render greater control and flexibility. For example, sensors monitoring an external environment may be coupled to the electronic control unit to assist in determining fan speed. Ventilation inlets or outlets may also be coupled to the electronic control unit for controlling flow of air into and out of the building, respectively.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
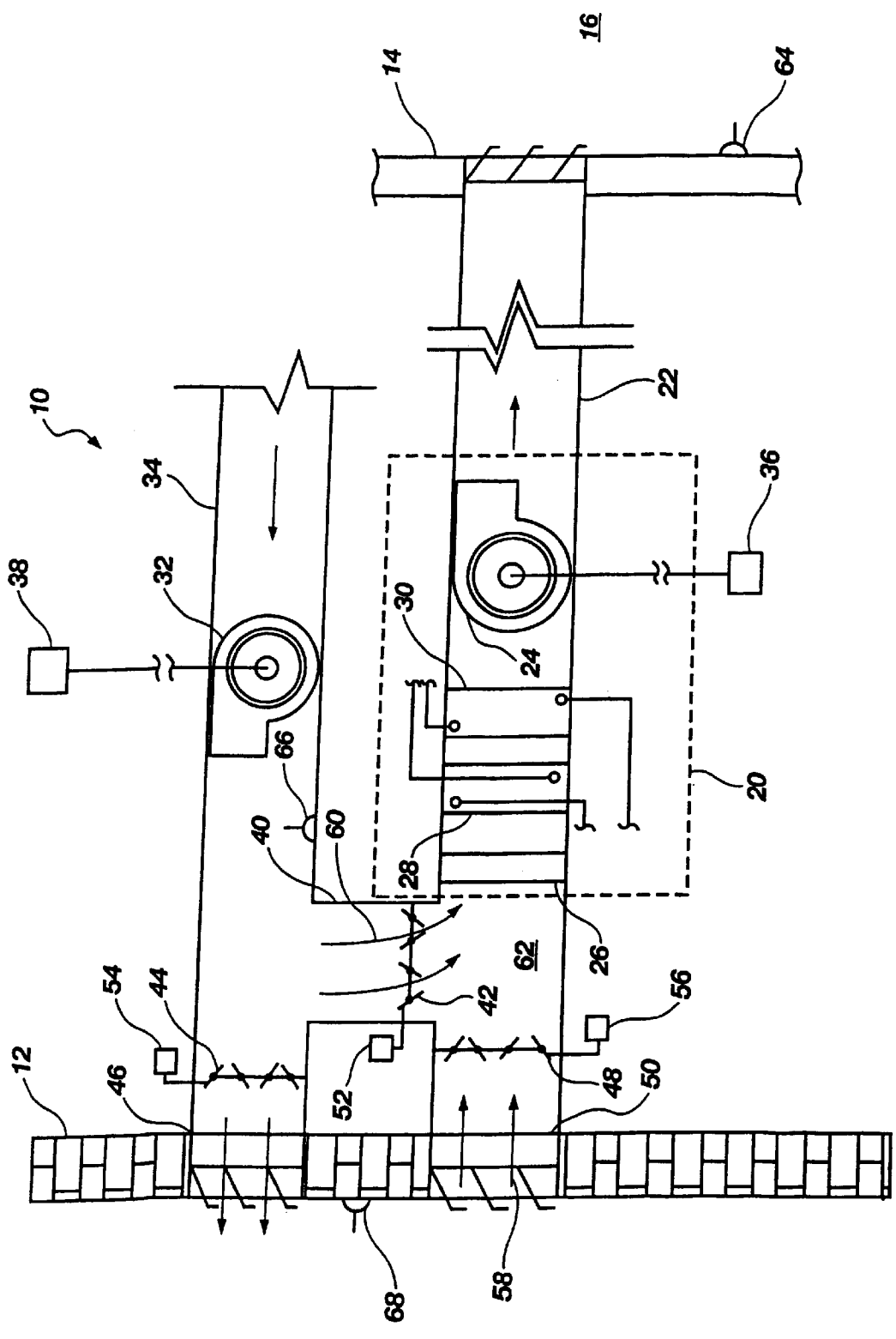
FIG. 1 is an elevational view of an HVAC system in accordance with certain aspects of the present invention.

Referring to FIG. 1, an HVAC system 10 implementing an environmental control system according to a particular embodiment of the invention is shown. The HVAC system 10 is implemented in a building designed for human occupancy which may include exterior and interior walls 12 and 14 which define the geographical locale of the internal environment 16 and separate it from an external environment 18. An air handling unit 20 is housed toward one end of a main air duct or plenum referred to as the supply duct 22. The air handling unit 20 includes at least one fan or blower 24 for inducing movement of air through the supply duct 22 and into the internal environment 16. Alternatively, the supply duct 22 may feed numerous secondary ducts (not shown) which may branch off and empty into the internal environment 16 at multiple locations.

In addition to the fan 24, the air handling unit 20 may include various conditioning devices such as a filter 26, a set of cooling coils 28, and/or a set of heating coils 30. Each of the conditioning devices may alter a given parameter of air as it passes by or through the device. For example, the filter 26 may remove unwanted particulates from the air. The cooling and heating coils 28 and 30 may alter the temperature of the air. Alternatively, the cooling and heating coils 28 and 30 may be operated individually or simultaneously to alter the humidity of the air. Additional devices may also be used in conjunction with the air handling unit 20 to effect a change in one or more parameters of the air. Such conditioning devices 26, 28 and 30, used independently or in combination, may be effective in assisting with the control of the internal environment 16 in conjunction with the disclosed system and method.

A second fan or blower 32 is located in a return duct 34 and draws air from the internal environment 16 for either exhaust or recirculation, as further discussed below. The supply fan 24 and the return fan 32 are coupled to variable-speed drives 36 and 38, respectively. The variable-speed drives 36 and 38 control the operating speed of the fans, thus allowing for a varied flow rate of air passing through the ducts 22 and 34. The return duct 34 and supply duct 22 have a connecting duct 40 which includes a set of louvers or adjustable vents 42. Similar louvers 44 may also be located near the exhaust region 46 of the return duct 34 with another set of louvers 48 optimally being located near the entrance 50 of the supply duct 22. Each set of louvers 42, 44 and 48 is operably coupled to an independent actuator 52, 54 and 56 respectively. The actuators may be controlled by various known mechanisms such as by pneumatic, hydraulic or electromechanical devices to adjust the louvers 42, 44 and 48 between an open and closed position. By altering the position of the louvers, the flow path of the air within the ducts is also altered. This further assists in controlling the quality of the air entering into the internal environment 16. For example, air flowing through the supply duct 22 into the internal environment 16 may be supplied as fresh external air from the external environment 18 as shown by flow indicators 58. The air supply may alternatively consist of return air directed through the connecting duct 40, as shown by flow indicators 60. The supply air may also comprise fresh air and return air which is combined in the mixing plenum 62 prior to entering the air handling unit 20. Return air may be exhausted to the external environment 18 depending on various external and internal conditions. The louvers 42, 44 and 48 help to determine the composition of the air flowing through the supply duct 22.

Various sensors can be positioned throughout the HVAC system for determining environmental parameters. For example, a first sensor 64 can be included to determine a parameter of the internal environment 16, a second sensor 66 can be included for determining an environmental parameter of the air in the return duct 34, and another sensor 68 (located in the external environment 18) can be included for determining a parameter of the external air. Such parameters may include, for example, the temperature or the humidity of the air at the respective locations of the sensors 64, 66 and 68. Additionally, other environmental parameters such as specified gas levels (such as $CO_2$) or particulate levels may be monitored using the sensors. It is also contemplated that additional sensors may be utilized or alternative locations may be selected to customize the HVAC system 10 to a specific building in which it is installed.

Figure 2:
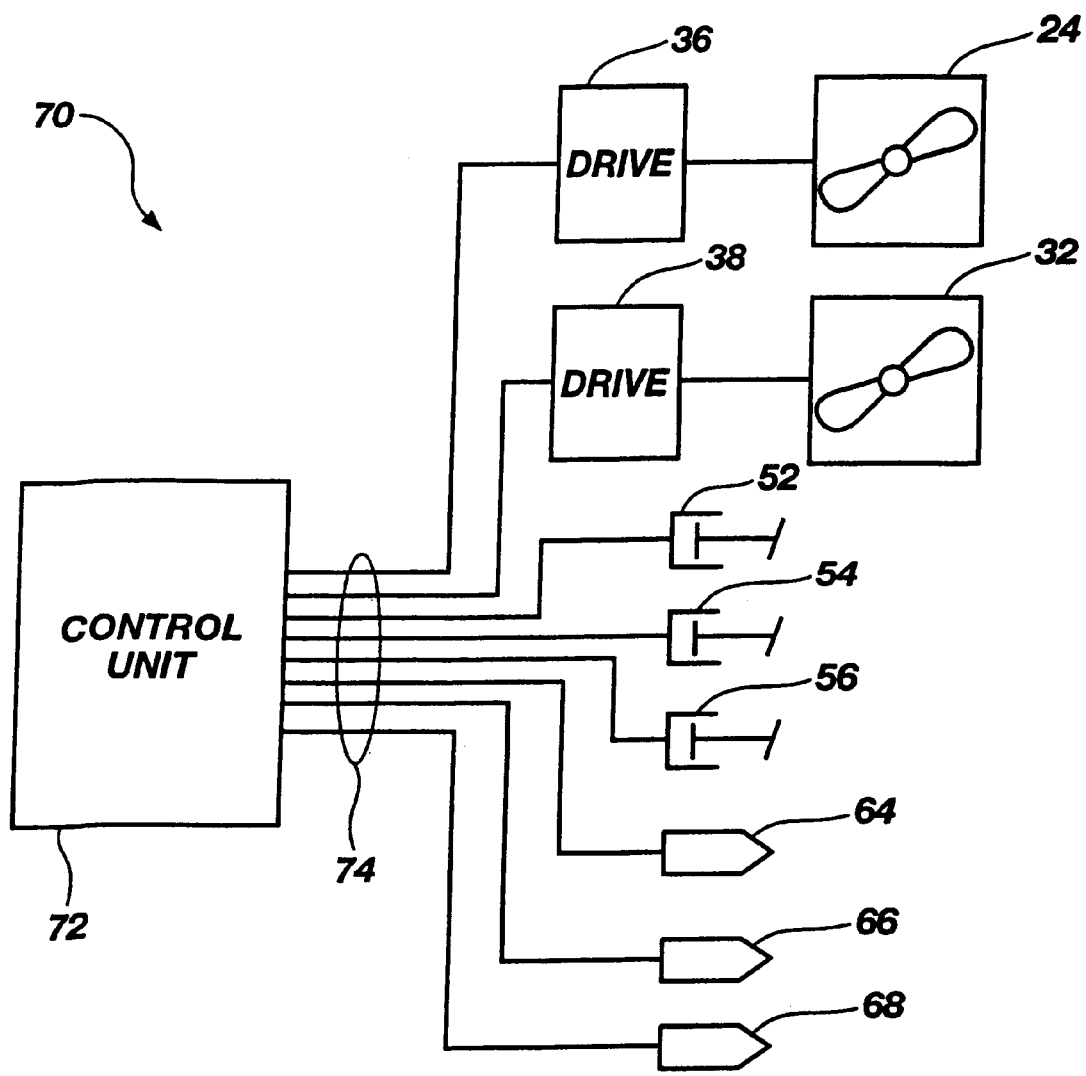
FIG. 2 is a schematic representation of an environmental control system in accordance with certain aspects of the present invention.

Referring now to FIG. 2, a schematic of a control system 70 for the HVAC system 10 of FIG. 1 is presented. The supply fan 24 and return fan 32 are each connected to their respective variable-speed drives 36 and 38. There are numerous types of variable-speed drives commercially available, each having various benefits and features. It is contemplated that the present system and method may be practiced utilizing different types of variable-speed drives for varying the rotational speed of the fans 24 and 32. For example, a variable-speed drive of the type employing a magnetic clutch may be used in the present technique. Such a drive varies the current supplied to the clutch, causing the magnetic force to vary between the clutch and the shaft. This allows a certain amount of slipage to occur between the shaft and the clutch, resulting in variation in the rotational speed of fans 24 and 32. While such a drive, and numerous others, may be suitable for use in practicing the present technique, the preferred drives utilized in the presently disclosed embodiment are variable-frequency drives, sometimes referred to as inverter drives.

As known by those skilled in the art, a variable-frequency drive (VFD) is an electronic controller that adjusts the speed of an electric motor by modulating the power being delivered. More specifically, the speed of the electric motor is controlled by modulating the frequency of the power being supplied. The standard frequency of AC power in the United States is 60 Hz. A standard electric motor constructed for use in the United States is designed to be operated with a 60 Hz power supply. A decrease in the frequency of the power supply will result in a corresponding decrease in motor speed. For example, an electric motor that rotates at 100 rpm with a 60 Hz power supply would run at 50 rpm when the power supply is reduced to 30 Hz.

Referring still to FIG. 2, one or more of the VFD's 36 and 38, the actuators 52, 54 and 56, and the sensors 64, 66 and 68 are connected to a control unit 72 by way of electrical wiring 74 such as a dedicated harness. Alternatively, the electrical wiring may be a common bus such as in a controller area network. In a particular embodiment of the invention, the control unit receives signals from the various sensors 64, 66 and 68, processes the information it receives, and then sends out command signals to the VFD's 36 and 38 and/or the actuators 52, 54 and 56. The VFD's 36 and 38 then interpret the command signals and send corresponding drive signals to the fans 24 and 32, respectively. In the above-described embodiment, a drive signal may include a signal from a power supply having an appropriately modulated frequency.

Through proper programing of either the control unit 72, the VFD's 36 and 38, or both, maximum speed settings may be established for the fans 24 and 32. Likewise, minimum speed settings may be set for the fans 24 and 32. Furthermore, parameter setpoints may be established for the overall operation and logic of the system. For example, a temperature value at which the building, or a specific region of the building, is to be maintained may be defined. Having a defined temperature value and sensing air temperature at various points in the stream of airflow, the system will operate to adjust fan speed and/or adjust the mix of airflow to alter an existing environmental parameter. It is noted that, with such a system, greater flexibility is realized through the use of variable-speed drives. By using VFD's or some other variable-speed drive, more gradual changes to the environment may be achieved.

The system of the present invention also provides reduced power consumption as a result of the nonlinear relationship between power consumption and fan speed. For example, a twenty percent reduction in fan speed can result in a fifty percent reduction in power consumption. Knowing that the rate of airflow varies linearly with fan speed, a simple calculation may be performed to compare airflow and power consumption for a system operating at full speed with a system operating at a reduced fan speed of eighty percent. A system operating at full power may circulate air, for example, at 100,000 cfm (cubic feet per minute). This system will circulate 6,000,000 cubic feet of air in a given hour. The reduced-speed system, however, will circulate air at a rate of 80,000 cfm, requiring an hour and fifteen minutes to circulate 6,000,000 cubic feet of air. However, even with the additional fifteen minutes of operating time, the reduced-speed system only consumes sixty-two and a half percent of the power used by the full-speed system. Indeed, operating the fan at even slower speeds can net even larger savings in power. In view of the energy savings, a fan may be operated continuously to maintain the building's environment within a tightly defined parameter range.

It is noted that while the schematic of FIG. 2 shows a single control unit 72, multiple controllers may be employed in operation of the HVAC system 10. For example, the control system 70 could be divided into subsystems wherein the supply fan 24 and drive 36 are designed as an individual subsystem. Similarly, the control of the return fan 32 and drive 38 may be combined to form a subsystem. Alternatively, one subsystem might include both fans 24 & 32 with their respective drives 36 and 38, while a second subsystem might include operation of the louvers 42, 44 and 48 by control of their associated actuators 52, 54 and 56, respectively. Additionally, conditioning devices such as the cooling or heating coils 28 and 30 may be included in the control system 70.

Figure 3:
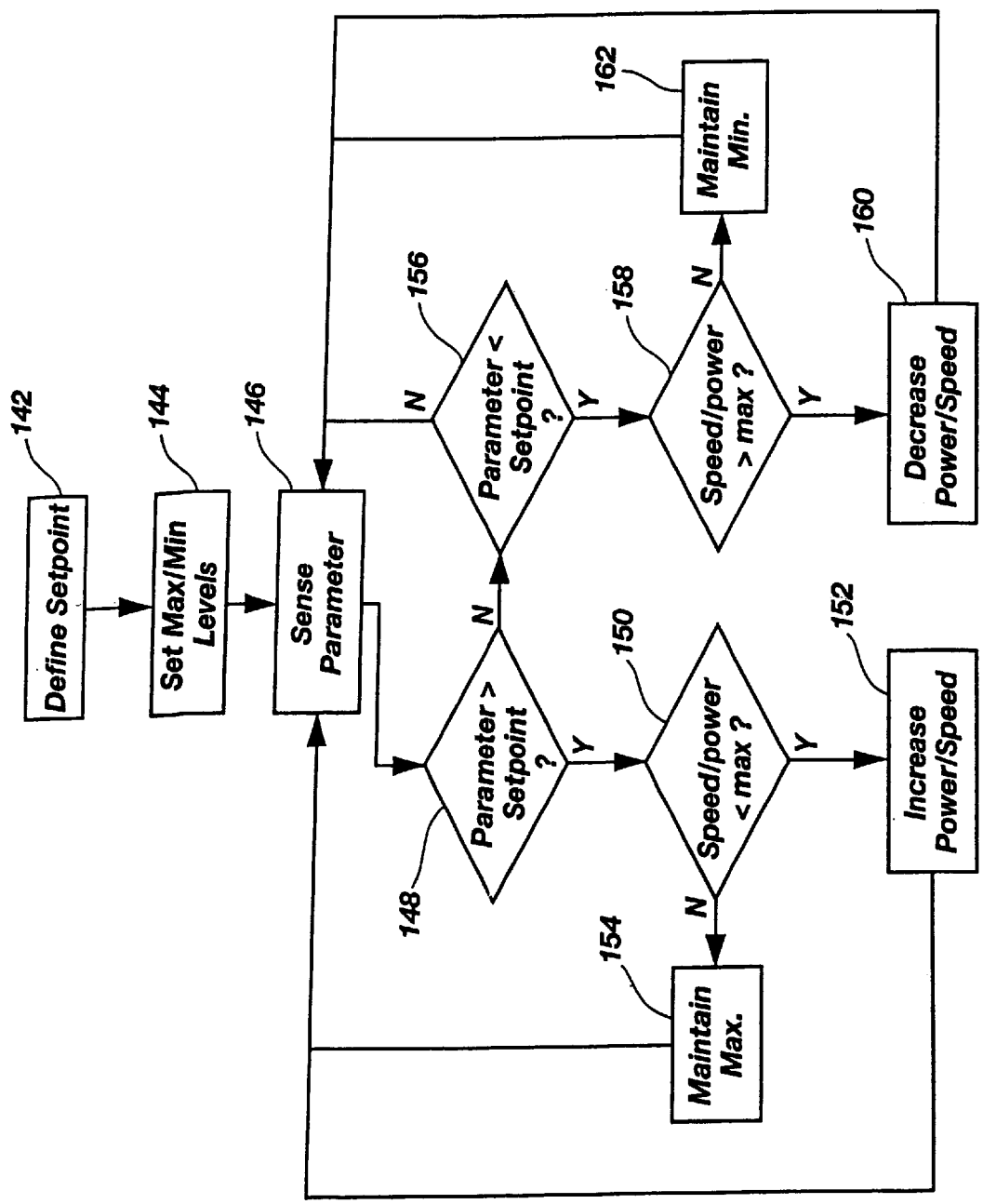
FIG. 3 is a block diagram illustrative of the logic employed in one embodiment of the invention.

Turning now to FIG. 3, and with reference to FIGS. 1 and 2, the logic employed according to one aspect of the present technique is discussed. First, a parameter setpoint 142 is defined. The parameter setpoint is the value at which the storage facility environment should be maintained, which setpoints, for example, correlate to one or more values relating to temperature, humidity, particulate levels or some other environmental parameter. For sake of clarity, and not by way of limitation, the maintenance of internal temperature will be used as an example of controlling a specific environmental parameter throughout the following discussion. The example will be discussed in terms of cooling the building; however, the same logic may be applied in heating the building or maintaining some other parameter.

Maximum and minimum fan speeds are defined, as shown at step 144, and are programed into either the control unit 72 or the VFD 36. Alternatively, maximum and minimum power consumption rates may be defined for the fans. An environmental parameter is then sensed 146 and an appropriate data signal is communicated to the control unit 72. The control unit 72 then determines if the sensed temperature is greater than the defined setpoint as indicated at 148. If the result is affirmative, then the control unit 72 determines whether the current speed of the supply fan 24 is less than the defined maximum, as shown at step 150. If this inquiry is affirmative, then the control unit 72 will increase the speed of the fan 24 as indicated at step 152. Following the increase of fan speed, the temperature is again sensed, as shown at step 146, with the process ready to repeat itself If the inquiry at step 154 is answered negatively, then the speed of the supply fan 24 is maintained at the maximum speed and the process returns to step 146.

If, however, the inquiry at 148 yields a negative response, the control unit 72 will then inquire whether the sensed temperature is less than the defined setpoint, as shown at 156. If the result is affirmative, a second inquiry is made as to whether the fan speed is greater than the minimum setting, as indicated at step 158. If the result to this inquiry is affirmative, then the fan speed is reduced, as shown at 160, and the process returns to step 146. If the inquiry at step 158 yields a negative response, then the fan speed is maintained at the minimum speed 162 and the process returns to step 146. Finally, if the inquiry at step 156 yields a negative result, the process likewise returns to step 146.

Thus, using the logic described above, the fan is operated continuously and, if the maximum setting is less than full power, it is operated continuously at a reduced speed. In the example above, the present technique allows for the continuous control of fan speed to maintain the building's environment at a defined temperature. It is noted that the chosen parameter need not be temperature. It is also noted that the above logic is discussed in reference to the speed of the supply fan 24 and that the control unit 72 may contemporaneously control the ventilation louvers 42, 44 and 48 as well as the speed of the return fan 32 to influence the building's environment.

Figure 4:
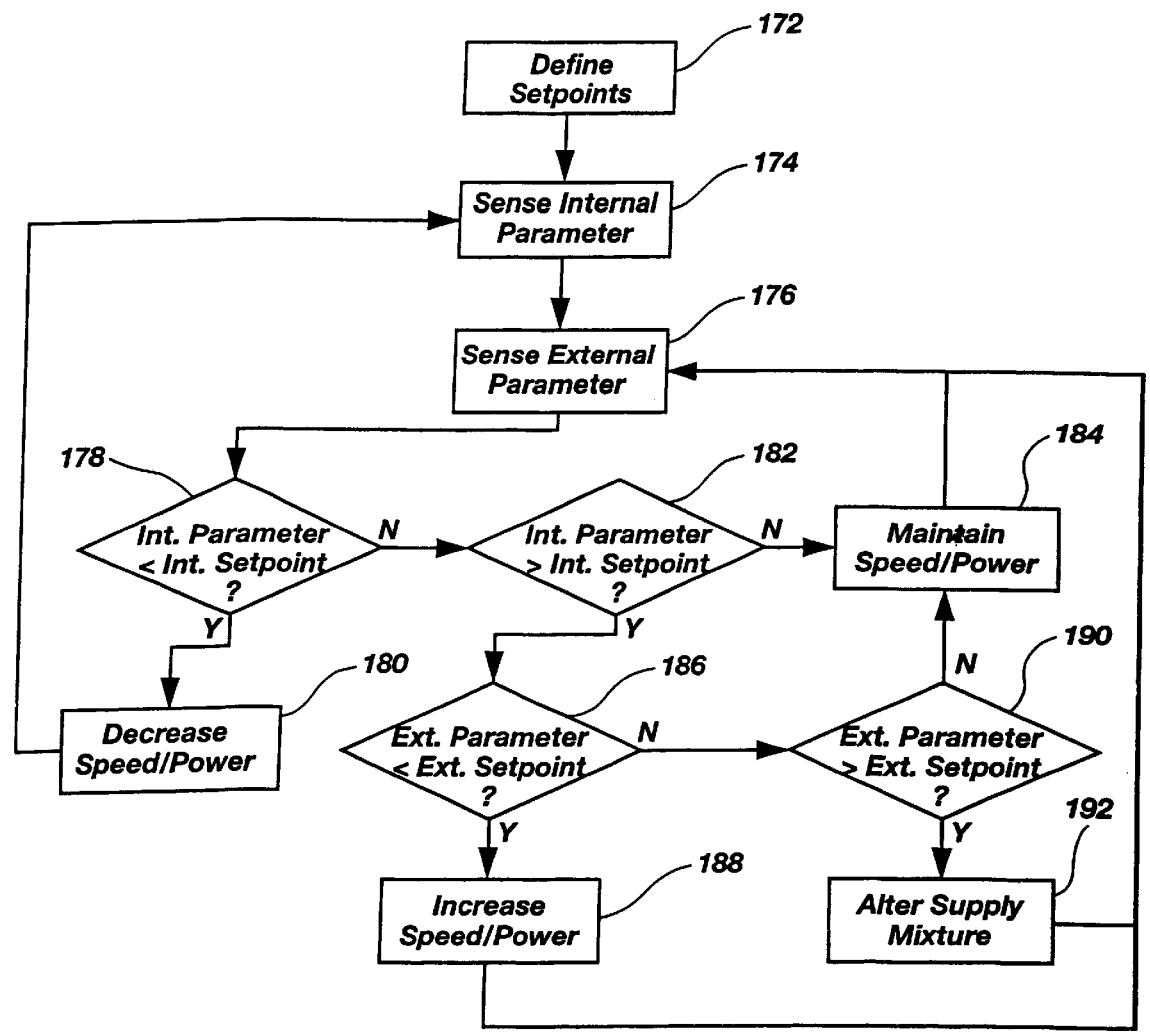
FIG. 4 is a block diagram illustrative of the logic implemented according to another embodiment of the invention.

Referring to FIG. 4, the operational logic according to an alternative embodiment is presented. First, parameter setpoints are defined as shown at step 172. Both, an internal setpoint and an external setpoint are defined. The internal setpoint is a parameter value at which the building's environment should be maintained. For example, it may be a value concerning temperature, humidity, particulate levels or some other environmental parameter. For sake of clarity, the following example will again focus on the control of temperature as the internal parameter to be maintained. The external setpoint is a parameter value which is used to override the system in specific instances. For this discussion, the external setpoint is also defined in terms of temperature. The example will be discussed in terms of cooling the building; however, the same logic may be applied in heating the building or maintaining one or more other parameter(s).

While not shown specifically in FIG. 4, maximum and minimum fan speeds may be defined according to the above description in reference to FIG. 3. An internal environmental parameter is then sensed, as shown at step 174, and an appropriate data signal is communicated to the control unit 72. An external parameter is also sensed as shown at 176. As noted above, the external parameter in this example is the ambient temperature outside the building. The control unit 72 then determines if the sensed temperature is less than the defined setpoint as indicated at 178. If the result is affirmative, then the control unit 72 will decrease the speed of one or more fans 24 and 32 as indicated at 180. Following the decrease in fan speed, the process returns to step 174. If the inquiry at step 178 is answered negatively, then the control unit 72 determines whether the sensed temperature is greater than the defined level as indicated at 182. If the result is negative, then the fan speed is maintained, as shown at 184, and the process returns to step 176. If, however, the result is affirmative, the control unit 72 further determines if the external temperature is less than the external setpoint, as seen at step 186. If the result to the inquiry at 186 is affirmative, then fan speed is increased as shown at step 188 and the process returns to step 176. If the result to the inquiry at 186 is negative, the control unit 72 determines whether the sensed external temperature is greater than the external setpoint, as shown at step 190. Again, if the result to this inquiry is negative, then the fan speed is maintained, as shown at step 184, and the process returns to step 176. If, however, the result to the inquiry at step 190 is affirmative, then the mixture of the supply air is altered as shown at step 192 and the process returns to step 176. Altering of the supply mixture may include various actions including opening and closing the ventilation louvers 42, 44 and 48 as required to recycle return air and exclude external air. Alternatively, or in combination with adjusting the louvers 42, 44 and 48, the speed of the fans 24 and 32 may be adjusted to effect an alteration of the mixture. This may include decreasing the speed of the supply fan 24 while increasing the speed of the return fan 32. Varying the speed of the fans inversely in conjunction with adjusting the louvers assists in recirculating the air in the building and avoids drawing in external air having a temperature above that which is acceptable. Thus, the inquiries shown at steps 186 and 190 work as a check on the external environment. This allows an override function to be in place such that the admittance of external air having an undesirable parameter does not interfere with the maintenance of one or more internal environmental values.

As noted above, such logic may also be employed to control environmental parameter different than those attributed in the above example with similar results being achieved. It is further noted that variations in the logic described may be employed in controlling the fans 24 and 32 in either a synchronous or independent fashion. Additionally, it should be understood that while the logic discussed in connection with FIGS. 3 and 4 are related to a particular system, the logic may be applied to other systems, or subsystems, as disclosed herein. For example, the logic described in FIGS. 3 and 4 may be further adapted for use with the conditioning systems and devices discussed herein.

While the invention may be susceptible to various modifications and alternative forms, specific embodiments have been shown by way of example in the drawings and have been describe in detail herein. However, it should be understood that the invention is not intended to be limited to the particular forms disclosed herein. Rather, the invention is to cover all modification, equivalents, and alternatives falling within the spirit and scope of the invention as defined by the following appended claims. For example, it is contemplated that while the embodiments and techniques described above have been shown to be combined into a single system, they may operate as individual systems or as subsystems.

What is claimed is:

1. A system for controlling an internal environment of a building designated for human occupancy comprising:

at least one air handling unit including at least one fan configured to induce air movement within let the building through continuous operation;

at least one variable-speed drive coupled to the at least one fan wherein the at least one variable-speed drive provides a drive signal to the at least one fan for controlling an operational speed of the at least one fan;

at least one sensor configured to determine at least one internal environmental parameter; and at least one electrical control unit coupled to the at least one sensor and to the variable-speed drive wherein the at least one electrical control unit receives a parameter signal indicative of the at least one internal environmental parameter from the at least one sensor and provides a command signal to the variable-speed drive based upon the parameter signal for varying the operational speed of the at least one fan, wherein the at/least one variable-speed drive is configured such that the at least one fan is operated continuously at less than full power.

2. The system of claim 1, wherein the at least one sensor includes a temperature sensor.

3. The system of claim 1, wherein the at least one sensor includes a humidity sensor.

4. The system of claim 1, wherein the at least one electrical control unit is programmed to send command signals to the variable-speed drive such that the at least one fan speed varies to maintain the internal environment at a predetermined value of the at least one internal environmental parameter.

5. The system of claim 1, further comprising a ventilation inlet wherein air external to the building is admitted into the internal environment and the ventilation inlet regulates a flow of the admitted air in response to the determined at least one internal environmental parameter.

6. The system of claim 1, further comprising at least one conditioning apparatus configured to alter a parameter of air passing through the at least one air handling unit.

7. The system of claim 1, further comprising at least one additional sensor adapted to determine at least one parameter of an environment external to the building wherein the at least one additional sensor is coupled to the at least one electrical control unit and provides an external parameter signal to the at least one electrical control unit.

8. The system of claim 7, further comprising a ventilation inlet wherein air external to the building is admitted into the internal environment and wherein the ventilation inlet regulates a flow of the admitted air in response to the determined at least one external environmental parameter.

9. The system of claim 8, wherein the at least one additional sensor includes a temperature sensor.

10. The system of claim 7, wherein the at least one electrical control unit is programmed to decrease the operational speed of the at least one fan upon receipt of an external parameter signal indicative of a sensed external temperature higher than a predetermined value.

11. The system of claim 1, wherein the variable-speed drive is adapted to have a maximum speed setting and a minimum speed setting such that the at least one fan is continuously running between the maximum and minimum speed settings.

12. The system of claim 1, further comprising at least one other fan and at least one other variable-speed drive coupled to and configured to control an operational speed of the at least one other fan, wherein the at least one fan is configured to supply air to at least a portion of the building and wherein the at least one other fan is configured to draw air from the at least a portion of the building.

13. The system of claim 12, wherein the at least one variable-speed drive is configured to control the at least one fan at a first speed and the at least one other variable-speed drive is configured to control the at least one other fan at a second speed different from the first speed.

* * * * *

UNITED STATES PATENT AND TRADEMARK OFFICE
CERTIFICATE OF CORRECTION

PATENT NO. : 6,467,696 B2
DATED : October 22, 2002
INVENTOR(S) : William P. Riley and William P. Riley, II It is certified that error appears in the above-identified patent and that said Letters Patent is hereby corrected as shown below:

Column 7,
Line 6, insert a period after "itself"

Column 8,
Line 46, change "describe" to -- described --

Signed and Sealed this

Twenty-fourth Day of June, 2003

JAMES E. ROGAN
*Director of the United States Patent and Trademark Office*